US009681278B2

(12) United States Patent
Bhagavatula et al.

(10) Patent No.: US 9,681,278 B2
(45) Date of Patent: Jun. 13, 2017

(54) VOIP SERVICE WITH STREAMLINED CONFERENCING OPTIONS

(75) Inventors: Satish Bhagavatula, Chandler, AZ (US); Manish Rao, Phoenix, AZ (US)

(73) Assignee: CREXENDO, INC., Tempe, AZ (US)

( * ) Notice: Subject to any disclaimer, the term of this patent is extended or adjusted under 35 U.S.C. 154(b) by 209 days.

(21) Appl. No.: 13/560,776

(22) Filed: Jul. 27, 2012

(65) Prior Publication Data

US 2014/0029474 A1 Jan. 30, 2014

(51) Int. Cl.
*H04L 12/26* (2006.01)
*H04W 4/16* (2009.01)
*H04L 29/06* (2006.01)
*H04L 12/18* (2006.01)
*H04W 4/12* (2009.01)

(52) U.S. Cl.
CPC ........... *H04W 4/16* (2013.01); *H04L 12/1827* (2013.01); *H04L 65/1093* (2013.01); *H04L 65/4038* (2013.01); *H04W 4/12* (2013.01)

(58) Field of Classification Search
CPC ...... H04L 12/16; H04L 65/1013; H04W 4/16; H04M 1/2473; H04M 7/006
USPC ........ 370/259, 271, 352; 379/212.01, 212.02
See application file for complete search history.

(56) References Cited

U.S. PATENT DOCUMENTS

| | | | |
|---|---|---|---|
| 8,036,362 B1 | 10/2011 | Skinner | |
| 8,054,963 B2 | 11/2011 | Kung et al. | |
| 9,043,870 B1 | 5/2015 | Barenholz et al. | |
| 2003/0055974 A1* | 3/2003 | Brophy | H04L 12/5835 709/227 |
| 2004/0066916 A1 | 4/2004 | Brown et al. | |
| 2005/0073964 A1 | 4/2005 | Schmidt et al. | |
| 2005/0152515 A1 | 7/2005 | Amir et al. | |
| 2005/0243809 A1 | 11/2005 | Best et al. | |
| 2006/0034266 A1 | 2/2006 | Harris et al. | |
| 2006/0227957 A1 | 10/2006 | Dolan et al. | |
| 2007/0220275 A1 | 9/2007 | Heitzeberg et al. | |
| 2008/0069327 A1 | 3/2008 | Kingsley et al. | |
| 2009/0141882 A1 | 6/2009 | Baeza | |
| 2009/0220064 A1* | 9/2009 | Gorti et al. | 379/202.01 |
| 2009/0268895 A1 | 10/2009 | Emerson | |
| 2009/0286514 A1* | 11/2009 | Lichorowic et al. | 455/412.2 |
| 2009/0305683 A1 | 12/2009 | Gupta et al. | |
| 2010/0142366 A1* | 6/2010 | Bugenhagen | H04L 41/147 370/216 |
| 2010/0254370 A1 | 10/2010 | Jana et al. | |
| 2010/0254375 A1 | 10/2010 | Feuerhahn et al. | |
| 2010/0279675 A1 | 11/2010 | Slack et al. | |
| 2011/0022968 A1* | 1/2011 | Conner et al. | 715/753 |
| 2011/0026701 A1 | 2/2011 | Kirchhoff et al. | |

(Continued)

OTHER PUBLICATIONS

U.S. Appl. No. 13/560,765, Office Action dated Jun. 30, 2014.

(Continued)

*Primary Examiner* — Shaq Taha
*Assistant Examiner* — Ryan Kavleski
(74) *Attorney, Agent, or Firm* — Conley Rose, P.C.

(57) ABSTRACT

In at least some embodiments, a system includes at least one server to manage voice over internet protocol (VOIP) services. The managed VOIP services provided by the at least one server include streamlined conferencing service to add a mobile device to a VOIP conferencing session based on a streamlined conferencing command received from the mobile device.

25 Claims, 13 Drawing Sheets

(56) References Cited

U.S. PATENT DOCUMENTS

| | | | |
|---|---|---|---|
| 2011/0124323 A1* | 5/2011 | Selph | H04M 1/645 455/415 |
| 2011/0151865 A1* | 6/2011 | Lau et al. | 455/433 |
| 2011/0182283 A1 | 7/2011 | Van Buren et al. | |
| 2011/0271209 A1* | 11/2011 | Jones et al. | 715/753 |
| 2012/0166545 A1* | 6/2012 | Alexandrov et al. | 709/205 |
| 2012/0264427 A1 | 10/2012 | Adatia et al. | |
| 2012/0327812 A1 | 12/2012 | Xiao et al. | |
| 2013/0086650 A1* | 4/2013 | Soundrapandian et al. | 726/5 |
| 2013/0262594 A1* | 10/2013 | Bastide et al. | 709/206 |
| 2014/0232817 A1* | 8/2014 | Jones et al. | 348/14.08 |

OTHER PUBLICATIONS

U.S. Appl. No. 13/560,784, Office Action dated Sep. 8, 2014.

U.S. Appl. No. 13/560,784, Response to Office Action dated Sep. 8, 2014, filed Jan. 8, 2015 (18 pages).

U.S. Appl. No. 13/560,765, Response to Office Action dated Jun. 30, 2014, filed Oct. 30, 2014 (14 pages).

U.S. Appl. No. 13/560,765, Final Office Action dated Mar. 3, 2015 (19 pages).

U.S. Appl. No. 13/560,765, Response to Final Office Action dated Mar. 3, 2015, filed May 4, 2015 (15 pages).

U.S. Appl. No. 13/560,784, Final Office Action dated May 8, 2015 (20 pages).

U.S. Appl. No. 13/560,765, Response to Office Action dated Dec. 15, 2015 filed Mar. 15, 2016 (14 pages).

U.S. Appl. No. 13/560,784, Office Action dated Jan. 8, 2016 (23 pages).

U.S. Appl. No. 13/560,784, Response to Final Office Action dated May 8, 2015, filed Jul. 8, 2015 (16 pages).

U.S. Appl. No. 13/560,784, Advisory Action dated Aug. 3, 2015 (6 pages).

U.S. Appl. No. 13/560,784, Request for Continued Examination and Preliminary Amendment in Response to Final Office Action dated May 8, 2015, filed Aug. 10, 2015 (17 pages).

U.S. Appl. No. 13/560,765, Advisory Action dated May 21, 2015 (6 pages).

U.S. Appl. No. 13/560,765, Request for Continued Examination and Preliminary Amendment in Response to Final Office Action dated Mar. 3, 2015, filed Jun. 16, 2015 (16 pages).

U.S. Appl. No. 13/560,765, Office Action dated Dec. 15, 2015 (23 pages).

U.S. Appl. No. 13/560,784, Response to Office Action dated Jan. 8, 2016 filed Apr. 8, 2016 (15 pages).

U.S. Appl. No. 13/560,765, Final Office Action dated Jul. 18, 2016 (22 pages).

U.S. Appl. No. 13/560,765, Response to Final Office Action dated Jul. 18, 2016 filed Sep. 16, 2016 (16 pages).

U.S. Appl. No. 13/560,765, Advisory Action dated Oct. 5, 2016 (6 pages).

U.S. Appl. No. 13/560,765, RCE and Response to Final Office Action dated Jul. 18, 2016 filed Oct. 18, 2016 (20 pages).

U.S. Appl. No. 13/560,765, Notice of Allowance dated Nov. 22, 2016 (11 pages).

U.S. Appl. No. 13/560,784, Final Office Action dated Aug. 5, 2016 (25 pages).

U.S. Appl. No. 13/560,784, RCE and Response to Final Office Action dated Aug. 5, 2016 filed Nov. 7, 2016 (18 pages).

U.S. Appl. No. 13/560,784, Notice of Allowance dated Dec. 5, 2016 (13 pages).

* cited by examiner

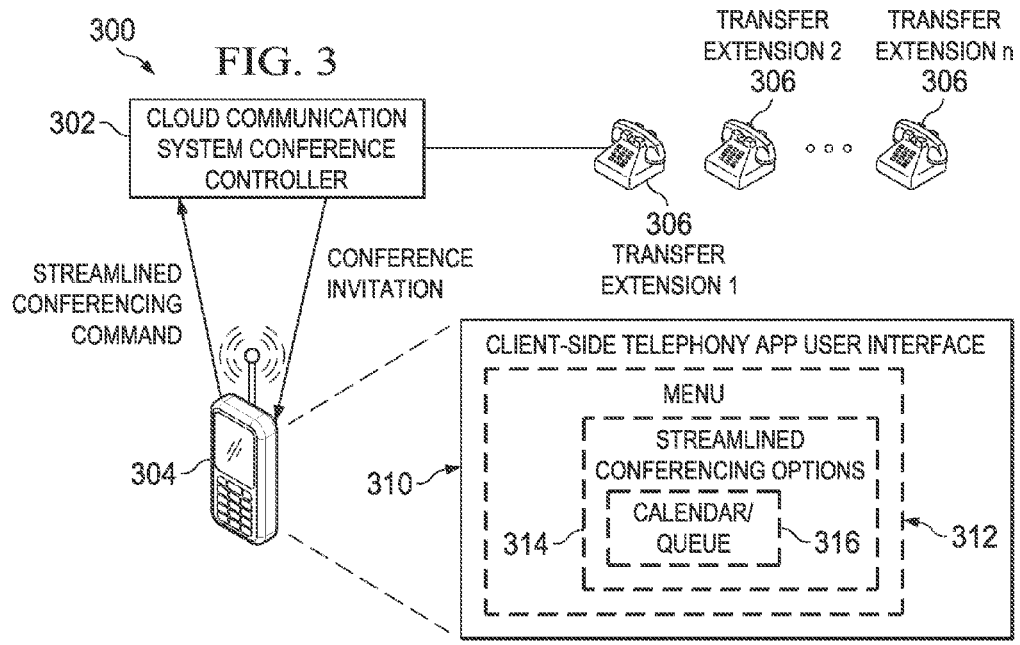
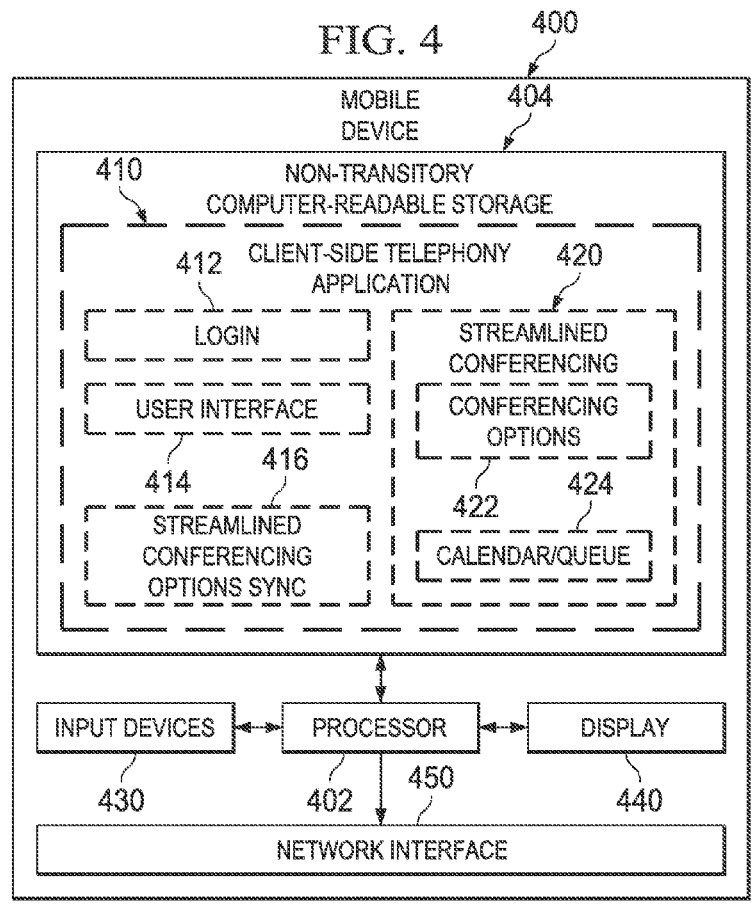

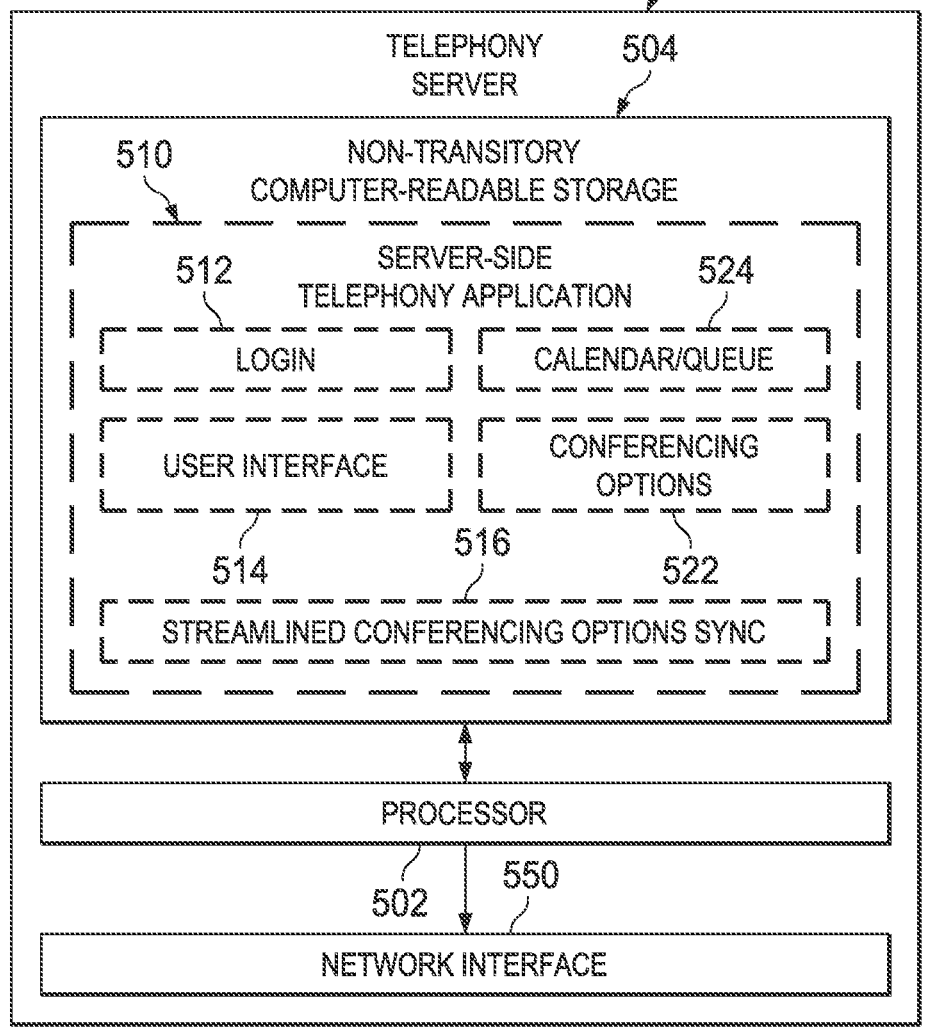

VOIP SERVICE WITH STREAMLINED CONFERENCING OPTIONS

BACKGROUND

The ongoing proliferation of wireless smart phones or other mobile devices has provided both public and private users with an unprecedented variety of functions that have extended the reach of dozens of voice and data applications to the palm of the hand. Many of these capabilities, provided by downloadable software applications, enable users of mobile devices with a wide range of specialized functions. Just as in the case of a desktop computer, mobile devices now support a large number of concurrent processes that can be installed to run in the background or on an as-needed basis. The choice of what and when is up to the user.

One useful feature of mobile devices in a business environment is taking office calls while traveling. While many private branch exchange (PBX) systems offer conference scheduling and participation, what is needed is an effective and novel solution that allows mobile users to quickly set up or participate in conferences.

BRIEF DESCRIPTION OF THE DRAWINGS

For a detailed description of exemplary embodiments of the invention, reference will now be made to the accompanying drawings in which:

FIG. 3 shows a conferencing operation for VOIP services in accordance with an embodiment of the disclosure;

FIG. 4 shows a mobile device in accordance with an embodiment of the disclosure;

FIG. 5 shows a telephony server in accordance with an embodiment of the disclosure;

NOTATION AND NOMENCLATURE

Figure 1:
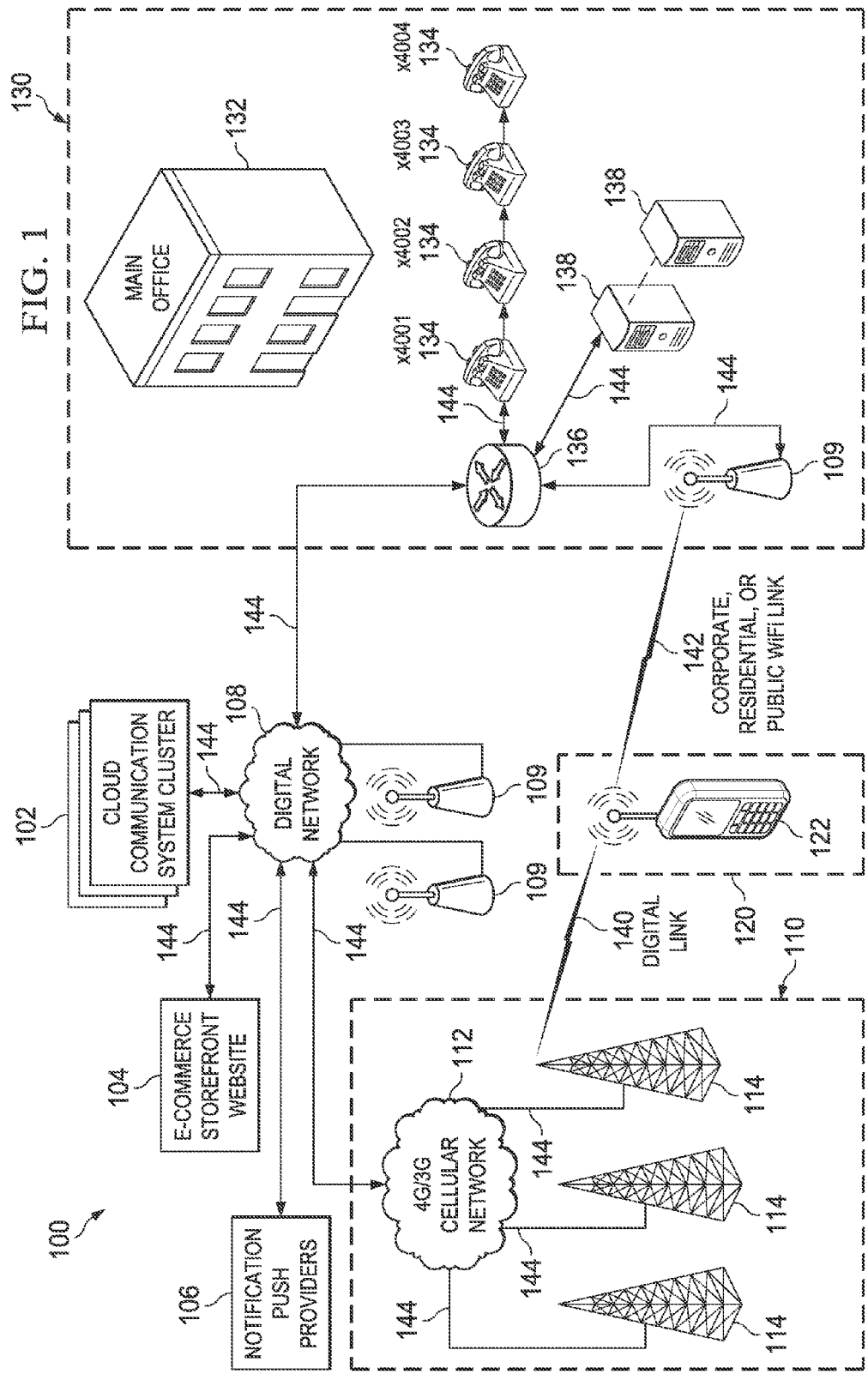
FIG. 1 shows a block diagram of a network environment in accordance with an embodiment of the disclosure.

Certain terms are used throughout the following description and claims to refer to particular system components. As one skilled in the art will appreciate, individuals and organizations may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

The following discussion is directed to methods and systems to set up and manage streamlined conferencing options for cloud-based VOIP services extended to mobile devices. While various examples of managing streamlined conferencing options for cloud-based VOIP services are provided, the examples disclosed should not be interpreted, or otherwise used, as limiting the scope of the disclosure, including the claims. In addition, one skilled in the art will understand that the following description has broad application, and the discussion of any particular example is not intended to intimate that the scope of the disclosure, including the claims, is limited to that example.

The streamlined conferencing features of a VOIP service as described herein are based on server-side VOIP operations and client-side VOIP operations, where at least some of the clients correspond to mobile devices. Each such mobile device may perform client-side VOIP operations, including the streamlined conferencing features disclosed herein, by executing a telephony application (T-App). In at least some embodiments, the VOIP service is provided for an enterprise or group of users. Such users may be members of an enterprise or other organization that subscribes to commercially selected and procured communication features associated with a VOIP service. As such, a contact list or calendar corresponding to the enterprise or organization may be utilized in conjunction with the streamlined conferencing features of the VOIP server.

In some embodiments, the server-side VOIP operations for streamlined conferencing may include adding a mobile device to a VOIP conferencing session based on a streamlined conferencing command received from the mobile device. Further, the server-side VOIP operations for streamlined conferencing may include storing a plurality of conferencing request bundles and matching the streamlined conferencing command to one of the stored conferencing request bundles to add the mobile device to the VOIP conferencing session. Further, the server-side VOIP operations for streamlined conferencing may include organizing conferencing request bundles as a table with a participants field, a date/time field, and a conferencing options selection field. Further, the server-side VOIP operations for streamlined conferencing may include updating a stored conferencing request bundle before a corresponding VOIP conferencing session begins based on information received from a mobile device.

Further, the server-side VOIP operations for streamlined conferencing may include receiving a selection of conferencing options with a streamlined conferencing command from a mobile device, and adjusting a VOIP conferencing session based on the selection of conferencing options received with the streamlined conferencing command. Further, the server-side VOIP operations for streamlined conferencing may include sending an invitation or reminder to the mobile device before a scheduled time for the VOIP conferencing session, where the invitation or reminder includes a link, token, or printable image associated with the streamlined conferencing command. Further, the server-side VOIP operations for streamlined conferencing may include sending an invitation or reminder to the mobile device before a scheduled time for the VOIP conferencing session, where the invitation or reminder includes a link or other mechanism to select conferencing options for the VOIP conferencing session. Further, the server-side VOIP operations for streamlined conferencing may include synchronizing updated conferencing options for a VOIP conferencing session with at least one mobile device before the VOIP conferencing session begins.

Without limitation to other embodiments, the client-side VOIP operations for streamlined conferencing may be managed by a telephony application executed on a mobile device. The client-side VOIP operations for streamlined conferencing may include transmitting streamlined conferencing command to add a mobile device to a VOIP conferencing session. Further, the client-side VOIP operations for streamlined conferencing may include triggering transmission of the streamlined conferencing command in response to user selection of a conferencing link from within an email or short message service (SMS) message. Further, the client-side VOIP operations for streamlined conferencing may include triggering transmission of the streamlined conferencing command operation in response to user selection of a conferencing link within a calendar. Further, the client-side VOIP operations for streamlined conferencing may include triggering transmission of the streamlined conferencing command operation in response to user selection of a conferencing link within a push notification reminder. Further, the client-side VOIP operations for streamlined conferencing may include triggering transmission of the streamlined conferencing command operation in response to user selection of a conferencing link within a previously received conference invitation. Further, the client-side VOIP operations for streamlined conferencing may include triggering transmission of the streamlined conferencing command operation in response to a voice input. Further, the client-side VOIP operations for streamlined conferencing may include triggering transmission of the streamlined conferencing command operation in response to the mobile communication device scanning a conference link image with the mobile communication device. The conference link image may be, without limitation to other examples, a quick response (QR) code, a bar code, or an alphanumeric code. Further, the client-side VOIP operations for streamlined conferencing may include activating for a VOIP conferencing session a predetermined subset of conferencing features from among a plurality of conferencing features supported by a mobile device. The plurality of conferencing features may include, with limitation to other examples, a number of participants, a video option, a whiteboard option, a workspace option, and a document display option. In some embodiments, a mobile device may include a dedicated conferencing queue button, and transmission of the streamlined conferencing command is triggered in response to the dedicated conferencing queue button being pressed.

If streamlined conferencing features of the VOIP service are already set up for the mobile device user's place of business, then installation of the T-App on the mobile device may including a configuration synchronization whereby the same configuration of conferencing features as what is set up for the mobile device user's place of business is available on the mobile device. Additionally, the user of the mobile device may access a user interface for the T-App installed on the mobile device to select or update conferencing features for the VOIP service. Such updates may be transmitted to a VOIP server to enable proper server-side operations to support the streamlined conferencing features. The transmission of updates may occur when the updates are selected, or in response to a scheduled or unscheduled sync operation. In some embodiments, such conferencing feature updates may be including with a streamlined conferencing command transmitted by a mobile device to a VOIP server as described herein. As needed, a user may be able to install the T-app on a new mobile device and maintain previously established conferencing features, by synchronizing the previously established conferencing features with the new mobile device. The previously established conferencing features may be stored by the VOIP server and may be assigned to a user account for the VOIP service independent of the mobile device. To access the VOIP service, including the conferencing features, a login or other authentication interface is provided for the VOIP service.

The operation of the VOIP service, including the streamlined conferencing features disclosed herein, depends on the availability of hosted communication services and mobile users who are connected to a "data service" via digital connections that are routed back to an Internet cloud. As long as a reliable digital path back to the host services is at a reasonable bit rate, the functionality described herein enables users to transact seamless communication features from their mobile devices regardless of the network that is used for communications.

It is common for mobile devices to have access to a large library of downloadable applications that, when purchased via electronic financial transactions or copied from another device, perform wide variety of functions such as games, GPS searches, storefront shopping, chat groups, etc. These applications are normally purchased en masse under a one-size-fits-all concept and are implemented in languages like JAVA to make them more interoperable between platforms, thus increasing the user base. Specifically, when an application is run, customization options are entered by the user and saved while the app is running. From that point on, the operation of the applications changes depending on the user-defined preferences. A customization process is disclosed herein to facilitate the usage of a telephony application without having to spend excessive time on local configurations that must be repeated over and over. In some embodiments, customized VOIP service features including streamlined conferencing features are included as part of a downloaded application at the time a subscription is activated from an online service.

FIG. 1 shows a block diagram of a network environment 100 in accordance with an embodiment of the disclosure. In the network environment 100, a hosted (or virtual) cloud communication system cluster 102 controls the disclosed VOIP service and conferencing features for both wired and wireless devices via a communication structure including a combination of Internet (cloud) networks 108, push notification providers 106, e-commerce storefront websites 104, hard wired connections 144, cellular network (e.g., 4G/3G) connections 140, and/or Wi-Fi links 142 to mobile users. The designation of hard wired connections 144 in the network environment 100 is intended to represent a suitable configuration rather than a requirement.

In FIG. 1, a mobile device layer 120 is able to communicate with the cloud communication system cluster 102 for VOIP services as disclosed herein via a cellular network layer 110 and/or an enterprise layer 130. More specifically, the mobile device 122 may implement a wireless transceiver to communicate with at least one base station 114 of the cellular network layer 110 via a digital link 140. The base stations 114 couple to a cellular network 112 (e.g., a 4G/3G network), which communicates with the cloud communication system cluster 102 via the digital network 108. The cellular network layer 110 provides wireless services on a wide area basis to subscribers using services such as cellular plans and data plans. The interconnected series of base stations 114 and switching centers provide a communication path for users on the go (roaming) to connect to VOIP services provided by the cloud communication system cluster 102. Integration initiatives between cellular networks 112 and other types of networks have allowed certain communication features to be seamlessly extended to the Internet via cloud connections.

The wireless transceiver of the mobile device 122 also may enable communications with at least one Wi-Fi network 109 that links the mobile device 122 to the enterprise layer 130. As shown, the enterprise layer 130 may comprise at least one Wi-Fi network 109, a router 136, computer systems 138, and/or fixed telephony devices 134. Without limitation to other embodiments, some or all of these enterprise layer components may be installed in an office building 132 associated with an enterprise. As shown, the router 136 communicates with the cloud communication system cluster 102 via the digital network 108. The digital network 108, sometimes referred to herein as the Internet or "cloud", enables ongoing communications between all the connected entities using a communication protocol such as transmission control protocol/internet protocol (TCP-IP) or user datagram protocol (UDP). Such communications are provided, for example, by a public carrier service that is available by subscribing to an Internet Service Provider (ISP).

Without limitation to other embodiments, various criteria for the networked system 100 include use of virtual or cloud private branch exchange (PBX) technology for system functions. Further, the networked system 100 may support a mobile device user that is associated with multiple wireless devices or wired devices. Further, the network system 100 enables registration and pre-configuration of VOIP services and streamlined conferencing features to be utilized by the mobile device 122. Further, the mobile device 122 may correspond to one of many possible brands of cell phones or smart phones.

To summarize, the networked system 100 enables the mobile device 122 to receive/make calls based on the VOIP service provided by the cloud communication system cluster 102. As disclosed herein, the VOIP service includes streamlined conferencing features that may be utilized, updated, enabled or disabled based on communications between the mobile device 122 and other components in the networked system 100.

Figure 2:
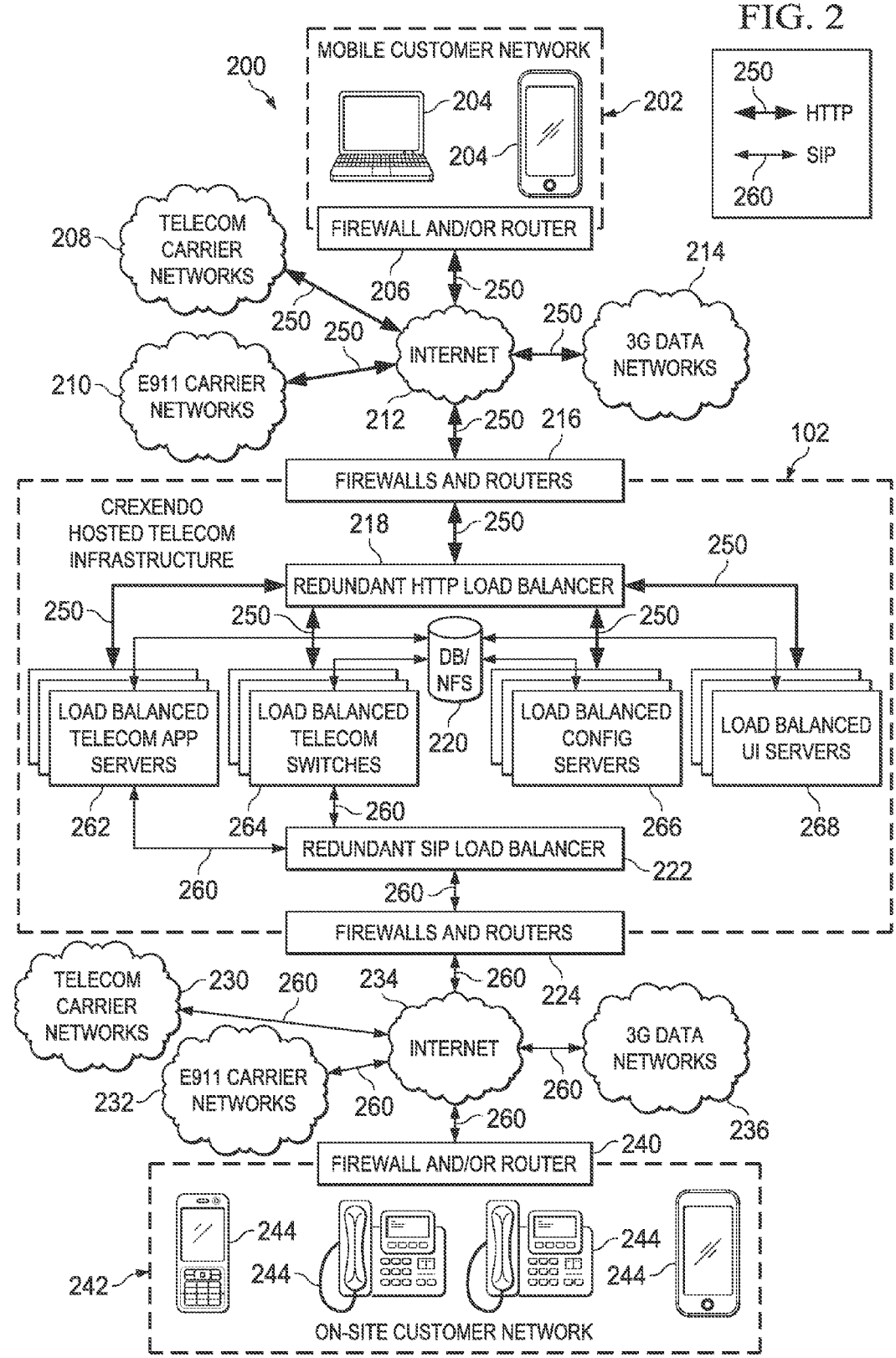
FIG. 2 shows a block diagram of a system to support Voice Over IP (VOIP) services in accordance with an embodiment of the disclosure.

FIG. 2 shows a block diagram of a system 200 to support VOIP services in accordance with an embodiment of the disclosure. The system 200 comprises the cloud communication system cluster 102 mentioned for FIG. 1 as well as other components. As shown, the cloud communication system cluster 102 comprises firewalls/routers 216 and 224 that filter and manage the transfer of data packets into and out of the cloud communication system cluster 102. Such data packets include communications to/from devices 204 of a mobile customer network 202 (e.g., corresponding to mobile and remote users) and communications to/from devices 244 that are part of an on-site customer network 242 (e.g., corresponding to users at an enterprise office location).

As an example, data packets from devices 204 of the mobile customer network 202 may be directed to the cloud communication system cluster 102 via a firewall/router 206 associated with the mobile customer network 202 and via the Internet 250 using hypertext transfer protocol (HTTP) links 250. Various networks such as telecom carrier networks 208, E911 carrier networks 210, and 3G data networks 214 may communicate via the Internet 212 to the devices 204 of the mobile customer network 202 and/or the cloud communication system cluster 102 using HTTP links 250. Similarly, data packets from devices 222 of the on-site customer network 242 may be directed to the cloud communication system cluster 102 via a firewall/router 240 associated with the on-site customer network 242 and via the Internet 234 using session initiation protocol (SIP) links 260. Various networks such as telecom carrier networks 230, E911 carrier networks 232, and 3G data networks 236 may communicate via the Internet 234 to the devices 244 of the on-site customer network 242 and/or the cloud communication system cluster 102 using SIP links 260.

In accordance with at least some embodiments, the cloud communication system cluster 102 comprises a redundant HTTP load balancer 218 and a redundant SIP load balancer 222 in communication with load balanced telecom application servers 262 and load balanced telecom switches 264 via respective HTTP links 250 and SIP links 260. The redundant HTTP load balancer 218 also is in communication with load balanced configuration servers 266 and load balanced user interface (UI) servers 268. The redundant HTTP load balancer 218 manages distribution of data packets over HTTP links 250 to the load balanced telecom application servers 262, the load balanced telecom switches 264, the load balanced configuration servers 266, and the load balanced user interface (UI) servers 268. Similarly, the redundant SIP load balancer 222 manages distribution of data packets over SIP links 260 to the load balanced telecom application servers 262, and the load balanced telecom switches 264. In operation, the various servers 262, 266, and 268 perform the VOIP services described herein based on applications being executed and data received from database/NFS (network file system) 220 as well as data received from the mobile customer network 202 and/or the on-site customer network 242. In at least some embodiments, the load balanced telecom switches 264 support communication operations and/or packets transfers related to the VOIP services described herein. Further, the balanced telecom application servers 262 and the load balanced UI servers 268 support user access to account information related to the VOIP services described herein. Further, the load balanced configuration servers 266 manage configuration options for the VOIP services described herein.

Without limitation to other embodiments, the load balanced telecom application servers 262, the load balanced telecom switches 264, the load balanced configuration servers 266, the load balanced UI servers 268, and the database/NFS 220 are customized to provide the VOIP services disclosed herein. Meanwhile, the firewall/routers 206, 216, 224, and 240, the redundant HTTP load balancer 218, and the redundant SIP load balancer 222 may correspond to off-the shelf components.

FIG. 3 shows a conferencing operation 300 for VOIP services in accordance with an embodiment of the disclosure. As shown, the conferencing operation 300 involves a mobile device 304 in communication with a cloud communication system conference controller 302, which may represent logic or executable instructions performed by the servers 262, 266, 268 of the cloud communication system cluster 102 described previously. For the conferencing operation 300, the cloud communication system conference controller 302 receives notification of a conference schedule and sends a corresponding conference invitation to a push notification provider (e.g., push notification provider 106) using a data packet that contains specific information regarding the conference in accordance with the notification requirements of the push notification provider. The push notification provider then forwards a push notification to the mobile device 304 via a wireless network facility. This ultimately results in a conferencing invitation or reminder being displayed on the mobile device 304. The push notification invitation or reminder may include a conferencing link. Upon selection of the link, a streamlined conferencing command is transmitted from the mobile device 304 to the cloud communication system conference controller 302 to initiate or join a conference. The transmission of the streamlined conferencing command may alternatively be triggered by selection of a conferencing link from within an email, an SMS message, or a calendar. The transmission of the streamlined conferencing command may alternatively be triggered by a voice input, by selection of a dedicated conferencing queue button, or by scanning a conference link image with the mobile device 304. The conference link image may be, without limitation to other examples, a quick response (QR) code, a bar code, or an alphanumeric code.

In at least some embodiments, the conferencing operation 300 is based on selections made via a client-side telephony application user interface 310. More specifically, the client-side telephony application user interface 310 may display a menu 312 with streamlined conferencing options 314. With limitation to other examples, the streamlined conferencing options 314 may include a number of participants, a video option, a whiteboard option, a workspace option, and a document display option. A calendar/queue 316 that includes conferencing information is also accessible via the client-side telephony application user interface 310 and may be used to manage streamlined conferencing options 316, to view invitations/reminders, to create new conference requests, and/or to transmit the streamlined conferencing command.

In some embodiments, when the streamlined conferencing command is received by the cloud communication system conference controller 302, the mobile device 304 is added to a VOIP conferencing session. For example, the cloud communication system conference controller 302 may store a plurality of conferencing request bundles and match the streamlined conferencing command to one of the stored conferencing request bundles to add the mobile device to a VOIP conferencing session. The cloud communication system conference controller 302 also may update the stored conferencing request bundle corresponding to the streamlined conferencing command before the VOIP conferencing session begins based on information received from the mobile device 304. For example, the cloud communication system conference controller 302 may receive a selection of conferencing options with the streamlined conferencing command, and adjust the VOIP conferencing session based on the selection of conferencing options received with the streamlined conferencing command. Alternatively, the cloud communication system conference controller 302 may send a conference invitation or reminder to the mobile device before a scheduled time for the VOIP conferencing session, where the invitation or reminder includes a link associated with the streamlined conferencing command. Additionally or alternatively, an invitation or reminder may also include a printable image associated with the streamlined conferencing command and/or a link to select conferencing options for the VOIP conferencing session. In some embodiments, updated conferencing options for the VOIP conferencing session may be synchronized between the mobile device 304 and the cloud communication system conference controller 302 before the VOIP conferencing session begins.

In some embodiments, a record of each issued client-side telephony application is stored by a database (e.g., database/NFS 220) of the cloud communication system cluster 102 for future reference. Over time, automatic upgrades or updates to the client-side telephony applications may be configured to include features that become available or that are purchased. If a mobile device is able to register with more than one communication system, multiple client-side telephony application may be downloaded and a management interface may be invoked to determine which will take control at runtime.

For the conferencing operation 300, an incoming code may contain all the information required to join the conference, either immediately or at some time in the future. After entering/scanning or otherwise converting the code at the point of presentation (e.g., optically readable media such as paper, computer screens, television monitors, binary tokens, or mobile phone displays), the user is presented with a menu of options to join a conference call in progress, wait for an acceptable period of time until the conference begins, or create a calendar entry to join at a future time. Calendar entries are created by copying all the necessary conference participation information that was gathered from the received code and may be stored in a calendar. This allows the user to later join the conference in a single step, in response to a calendar notification, without having to enter the conference information again when the calendar notification is received.

The streamlined conferencing functionality may be downloaded from the cloud communication system conference controller 302 by the mobile device 304 and installed as a part of a T-App when the mobile device 304 is registered. The T-App is customized by an "app store" or a company's private Information System (IS) group who distributes it to be compatible with the particular mobile device on which it is installed. The T-App then directs the appropriate function calls to the mobile device's operating platform to execute a set of conference functions on multiple networks. This may be done in an essentially identically manner for a group of corporate, organizational, or other subscribing users (having the same Tenant ID or other common group identifier). The functional characteristics of the mobile user interface is generally shared by all group members, regardless of which type of network or mobile device is used to process calls.

When handling conference calls, each user in the group sees a directory of the other group users and may manually setup a conference by calling each user individually. However, it is often more convenient for a user who has the role of conference moderator to send out invites to begin the conference request process and set up the conference. For example, a conference moderator may compose invites to users in a common Tenant ID or other group. The cloud communication system conferencing controller 302 then sends out QR Code images, web hyperlinks, or other tokens at conference time or for a future time. Participants may optionally acknowledge availability to participate in the conference and elect to drop out. To join a scheduled conference, participants, scan the code or consume the token. Once a scheduled conference is activated or deferred, and the cloud communication system conferencing controller 302 may perform additional steps such as acknowledging a conference status to participants, enable completion of the conference, and save a conference log.

When setting up a conference request, the conference moderator logs onto the cloud communication system associated with the cloud communication system conferencing controller 302 and uses a conference participant grouping utility to gather together all of the positive responses from the conference participants. Once this is done, the cloud communication system conferencing controller 302 generates a set of "CONF_INVITE" messages that are transmitted to each user by means of a QR Code or other token. Upon receipt of the CONF_INVITE message, each user performs a conference setup function which is responsive to the information contained in the code by optical scan, screen interpretation, web reference, or other interpretation means. This information may include the conference start time, duration, dial-in number, personal identification number (PIN), and a hyperlink to lookup additional information pertaining to the conference such as subject, agenda, participants, prerequisites, overviews, etc. The conference setup function may also enable selection of conferencing options such as a video option, a whiteboard option, a workspace option, and a document display option.

The mobile device 304 presents the user with several possible conferencing options depending on the situation. The options, for example, may be organized as a menu of items such as "enter the conference now", "queue for the conference until it opens up", "make a calendar entry for a later time", or "drop out". The actual number of options presented may be reduced if the conference is imminent or is already in progress. If the user chooses the option to drop out of the conference, no further involvement is necessary and the user will be automatically removed from the participant group by the system. If the calendar entry option is used, the mobile device's calendar function is used to save the information until the appropriate time arrives. When a user of the mobile device 304 is later presented with a calendar reminder, a custom function is run under control of the T-App to either queue on the conference or to enter as a participant immediately when the user indicates acceptance.

Upon completion of the conference, all entries are discarded and a log entry is created in the mobile device 304 or in storage on a network server(s) for future reference. This log includes a list of the conference participants that may be referenced in the future should any of the participants wish to take on the role of moderator at a later date and repeat the process again with the same participants or by using an edited list of participants. A log entry is also created and saved for later access by the cloud communication system conferencing controller 302 so that information may be recalled as a "recent conference" by any of the conference participants. This may also be restricted as an optional capability that can only be accessed by authorized conference moderators.

Conference records may also be saved on an e-Commerce website that is used by customers who have a business relationship and have participated in a conference with a user who operates the e-Commerce website either as a storefront owner or employee. This enables a user to access the e-Commerce website from any location on a mobile device and reactivate a previous conference by sending out invites and starting the process all over again. These historic records of previous conference calls are kept up to date when the cloud communication system conferencing controller 302 updates information in a related e-Commerce website upon termination of related conference calls with customers or other parties appropriate for participation.

In some embodiments, the cloud communication system cluster 102 or a related e-commerce storefront is aware of a user's corporate environment or subscriber class. In such case, a certain amount of customization is applied to a client-side telephony application before download, either in form of customized software code or by using specific configuration data that is downloaded as part of, or is otherwise associated with the client-side telephony application. Specifically, a configuration-specific piece of information may be downloaded that affects the user's membership in a corporate environment (e.g., an alias ID or other identifier and an extension may be included). These fields are used to identify the individual mobile device in a corporate, organizational, or other group environment.

As an example, suppose John Williams has two mobile devices. One is used in the car as a built-in unit and John takes the other one along with him. In one mode of operation, the same alias ID and alias display name is assigned to both of John's mobile extension numbers (Alias ID="JD_Williams_Mbl" and Alias display Name="John Williams (mobile)") using extension number 21573 and 21574. When John's name is viewed in the corporate directory, the only name that is displayed is John Williams (mobile). When this name is called, both phones are accessed and "forked" under a Session Initiation Protocol (SIP) command code and John picks up the call on the currently active mobile device. John's phone in the office at extension number 20611 has the Alias ID "JD_Williams_Ofc" and the display name "John Williams (office)". In this case, John's office phone is called only when the appropriate directory name is accessed by a caller or someone sending a message.

It is also possible to have one Alias Display Name (John Williams) assigned to both a mobile device and an office phone. In this case, the caller is not aware of the arrangement of John's phones and simply calls John Williams using the Alias Display Name. When the call is made, all three devices are forked using the SIP and John picks up the call on the appropriate device. In the embodiments disclosed herein, the contact list names or identifiers and any forking options are available for streamlined conferencing operations.

FIG. 4 shows a mobile device 400 in accordance with an embodiment of the disclosure. The mobile device 400 may, for example, corresponds to mobile device 122 of FIG. 1, the devices 204 of FIG. 2, or the mobile device 304 of FIG. 3. As shown, the mobile device 400 comprises a processor 402 coupled to a non-transitory computer readable storage 404 storing a client-side telephony application 410. The mobile device 304 also comprises input devices 430, a display 440, and a network interface 450 coupled to the processor 402.

The mobile device 400 is representative of a smartphone, a cellular phone, a personal digital assistant (PDA), a tablet computer, a laptop computer, or other mobile device configured to communicate with the cloud communication system cluster 102 for VOIP services. The processor 402 is configured to execute instructions read from the non-transitory computer readable storage 404. The processor 402 may be, for example, a general-purpose processor, a digital signal processor, a microcontroller, etc. Processor architectures generally include execution units (e.g., fixed point, floating point, integer, etc.), storage (e.g., registers, memory, etc.), instruction decoding, peripherals (e.g., interrupt controllers, timers, direct memory access controllers, etc.), input/output systems (e.g., serial ports, parallel ports, etc.) and various other components and sub-systems.

In some examples, the non-transitory computer readable storage 404 corresponds to random access memory (RAM), which stores programs and/or data structures during runtime of the mobile device 400. For example, during runtime of the mobile device 400, the non-transitory computer readable storage 404 may store the client-side telephony application 410 for execution by the processor 402 to perform the call transfer operations described herein. The client-side telephony application 410 may be distributed to the mobile device 400 via a network connection or via a local storage device corresponding to any combination of non-volatile memories such as semiconductor memory (e.g., flash memory), magnetic storage (e.g., a hard drive, tape drive, etc.), optical storage (e.g., compact disc or digital versatile disc), etc. Regardless the manner in which the client-side telephony application 410 is distributed to the mobile device 400, the code and/or data structures corresponding to the client-side telephony application 410 are loaded into the non-transitory computer readable storage 404 for execution by the processor 402.

The input devices 430 may comprise various types of input devices for selection of data or for inputting of data to the mobile device 400. As an example, the input devices 430 may correspond to a touch screen, a key pad, a keyboard, a cursor controller, or other input devices.

The network interface 450 may couple to the processor 402 to enable the processor 402 to communicate with the cloud communication system cluster 102. For example, the network interface 450 may enable the mobile device 450 to receive VOIP services and/or to update VOIP service options. In different embodiments, the network interface 450 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. The network interface 450 may enable the processor 402 to communicate with the Internet or one or more intranets. With such a network connection, it is contemplated that the processor 402 might receive information from the network, or might output information to the network in the course of performing the call transfer features described herein. Such information, which is often represented as a sequence of instructions to be executed using processor 402, may be received from and outputted to the network, for example, in the form of a computer data signal embodied in a carrier wave.

Such information, which may include data or instructions to be executed using processor 402 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well known to one skilled in the art. The baseband signal and/or signal embedded in the carrier wave may be referred to in some contexts as a transitory signal.

The processor 402 executes instructions, codes, computer programs, scripts which it accesses from hard disk, floppy disk, optical disk (these various disk based systems may all be considered secondary storage), read-only memory (ROM), random access memory (RAM), the network interface 450, or the input devices 430. While only one processor 402 is shown, multiple processors may be present. Thus, while instructions may be discussed as executed by a processor, the instructions may be executed simultaneously, serially, or otherwise executed by one or multiple processors.

In accordance with at least some embodiments, the client-side telephony application 410 comprises a login module 412, a user interface module 414, a streamlined conferencing option sync module 416, and a streamlined conferencing module 420 to support the VOIP services and the streamlined conferencing services described herein. More specifically, the streamlined conferencing module 420 comprises conferencing options 422 and a calendar queue 424 related to streamlined conferencing.

The login module 412 enables a user of the mobile device 400 to log into a VOIP service corresponding to a communication session established with the cloud communication system cluster 102. After a successful logic, a user interface is presented on the mobile device 400 based on instructions and formatting data in the user interface module 414. The user interface module 414 may provide a user interface that enables the user of the mobile device 400 to make/receive VOIP calls, to select from or update a contact list, to review a call log or voicemails, to select or update streamlined conferencing options, or to perform other operations. The streamlined conferencing options sync module 416 enables a user to receive updated conferencing options from the cloud communication system cluster 102. Such updates may have been previously submitted to the cloud communication system cluster 102 by a user at an on-site computing device or mobile device.

The streamlined conferencing module 420, with the streamlined conferencing options 422 and the calendar/queue 424, enables the streamlined conferencing operations described herein. In at least some embodiments, execution of the client-side telephony application 410 causes the processor 402 to transmit a streamlined conferencing command operation to add the mobile device to a voice over internet protocol (VOIP) conferencing session. In various embodiments, the processor 402 may trigger transmission of the streamlined conferencing command in response to user selection of a conferencing link from within an email, an SMS message, a calendar, a push notification invitation, or a push notification reminder. Alternatively, the processor 402 may trigger transmission of the streamlined conferencing command in response to the mobile device 400 scanning a conference link image or token, or receiving a scanned conference link image or token. The conference link image or token may correspond to, for example, a QR code, a bar code, or an alphanumeric code. Alternatively, the processor 402 may trigger transmission of the streamlined conferencing command in response to a voice input received by the mobile device 400 or a dedicated conferencing queue button being pressed.

In some embodiments, the client-side telephony application 410, when executed, causes the processor 402 to activate for a VOIP conferencing session a predetermined subset of conferencing features from among a plurality of conferencing features supported by the mobile device 400. The plurality of conferencing features comprise a number of participants, a video option, a whiteboard option, a workspace option, and/or a document display option.

FIG. 5 shows a telephony server 500 in accordance with an embodiment of the disclosure. The telephony server 500 may be part of the cloud communication system cluster 102 to provide the VOIP services and server-side streamlined conferencing operations as described herein. As shown, the telephony server 500 comprises a processor 502 and a non-transitory computer-readable storage 504 that stores a server-side telephony application 510. The processor 502 also couples to a network interface 550 that enables network communications as described herein. In accordance with at least some embodiments, the server-side telephony application 510 comprises a login module 512, a user interface module 514, a streamlined conferencing options sync module 516, and a streamlined conferencing module 520 to support the VOIP services and the streamlined conferencing services described herein. More specifically, the streamlined conferencing module 520 comprises streamlined conferencing options 522 and a calendar/queue 524 related to conferencing.

The login module 512 enables a user of a mobile device (e.g., mobile device 400) to log into a VOIP service corresponding to a communication session established with the cloud communication system cluster 102. The user interface module 514 stores instructions and/or data to enable server-side operations that are compatible with user interface options available on a client-side telephony application. The streamlined conferencing options sync module 516 enables updates for streamlined conferencing options to be stored and submitted to a mobile device as needed. Such updates may have been previously submitted to the cloud communication system cluster 102 by a user at an on-site computing device or mobile device.

The streamlined conferencing module 520, with the streamlined conferencing options 522 and the calendar/queue 524, enables the server-side call transfer operations described herein. In at least some embodiments, execution of the server-side telephony application 510 by the processor 502 causes the telephony server 500 to receive a streamlined conferencing command from a mobile device and to add the mobile device to a VOIP conferencing session based on the streamlined conferencing command. Execution of the server-side telephony application 510 by the processor 502 also may cause the telephony server 500 to store a plurality of conferencing request bundles and match a streamlined conferencing command to one of the stored conferencing request bundles to add a mobile device to the VOIP conferencing session. Execution of the server-side telephony application 510 by the processor 502 also may cause the telephony server 500 to organize the plurality of conferencing request bundles as a table with a participants field, a date/time field, and a conferencing options selection field. A stored conferencing request bundle corresponding to a streamlined conferencing command may be updated before the VOIP conferencing session begins based on information received from a mobile device.

Execution of the server-side telephony application 510 by the processor 502 also may cause the telephony server 500 to receive a selection of conferencing options with the streamlined conferencing command, and to adjust the VOIP conferencing session based on the selection of conferencing options received with the streamlined conferencing command. Execution of the server-side telephony application 510 by the processor 502 also may cause the telephony server 500 to send an invitation or reminder to a mobile device before a scheduled time for the VOIP conferencing session, where the invitation or reminder includes a link or printable image associated with the streamlined conferencing command. An invitation or reminder may additionally include a link or printable image to select conferencing options for the VOIP conferencing session. Execution of the server-side telephony application 510 by the processor 502 also may cause the telephony server 500 synchronize updated conferencing options for a VOIP conferencing session with a mobile device before the VOIP conferencing session begins.

Figure 6A:
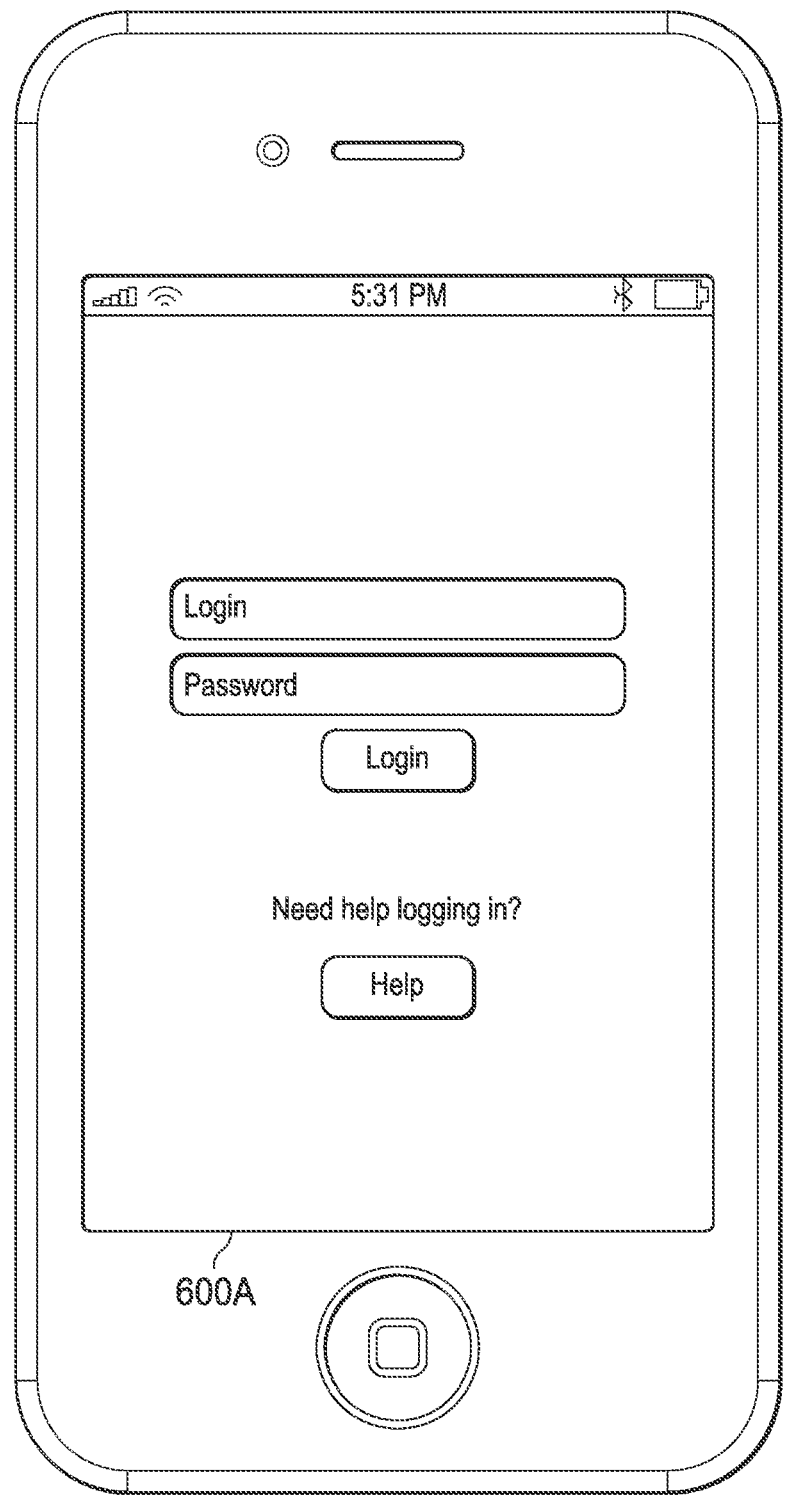
FIGS. 6A-6H shows screenshots of a client-side telephony application in accordance with an embodiment of the disclosure.

Without limitation to other embodiments, FIGS. 6A-6M shows screenshots 600A-600M of a client-side telephony application in accordance with some embodiments of the disclosure. In FIG. 6A, screenshot 600A shows a login screen with a login entry space, a password entry space, a login button, and a help button. Once the login button is pressed, authentication of the information in the login entry space and the password entry space is attempted. If login is successful, a VOIP service session is initiated.

Figure 6B:
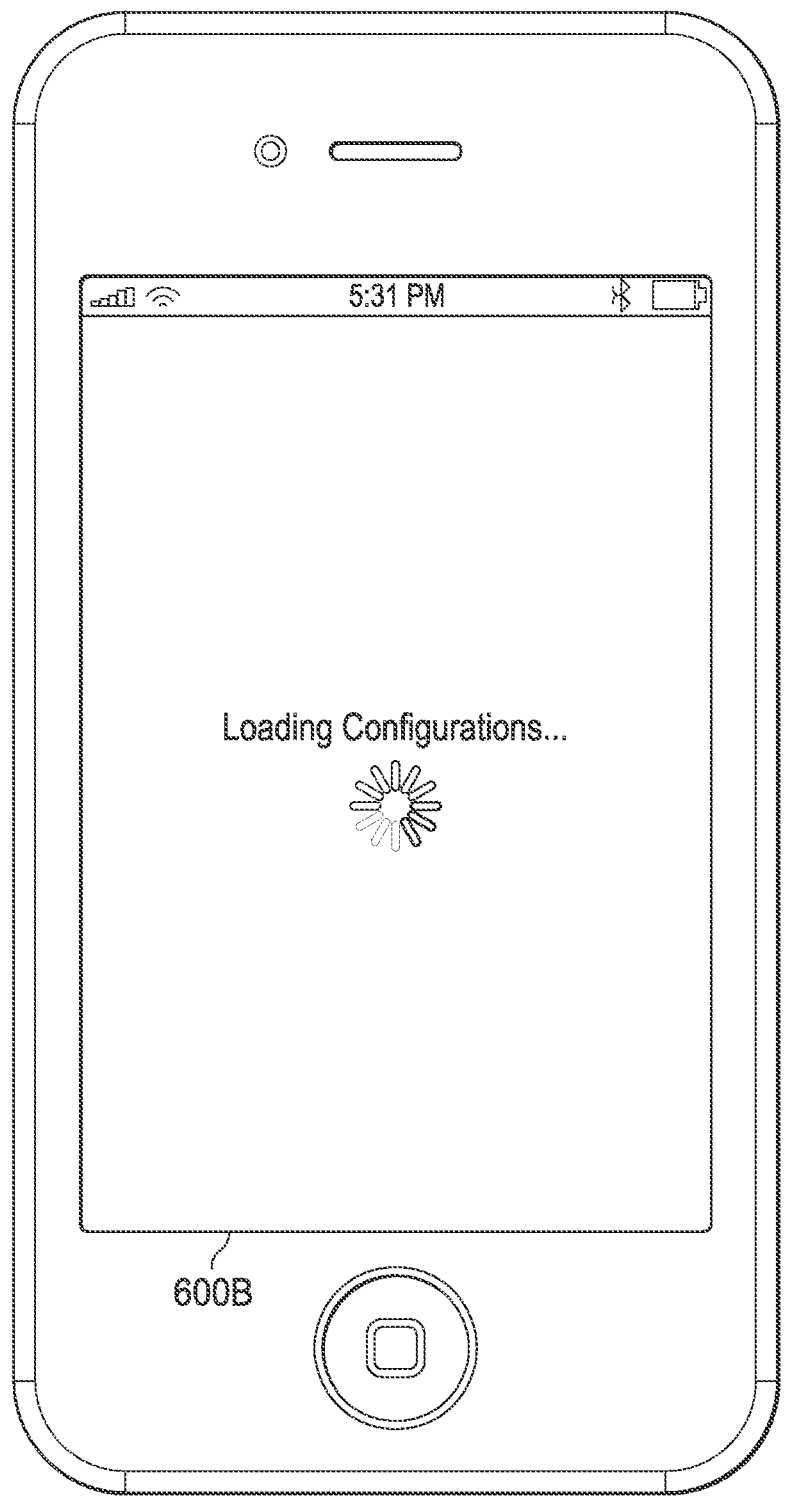

In FIG. 6B, screenshot 600B shows that a VOIP service session begins by loading configuration information. The loading of configuration information may account for updates to the VOIP service, including updates to streamlined conferencing options, that have been stored by the cloud communication system cluster 102, but that are not yet stored on the mobile device executing the client-side telephony application.

Figure 6C:
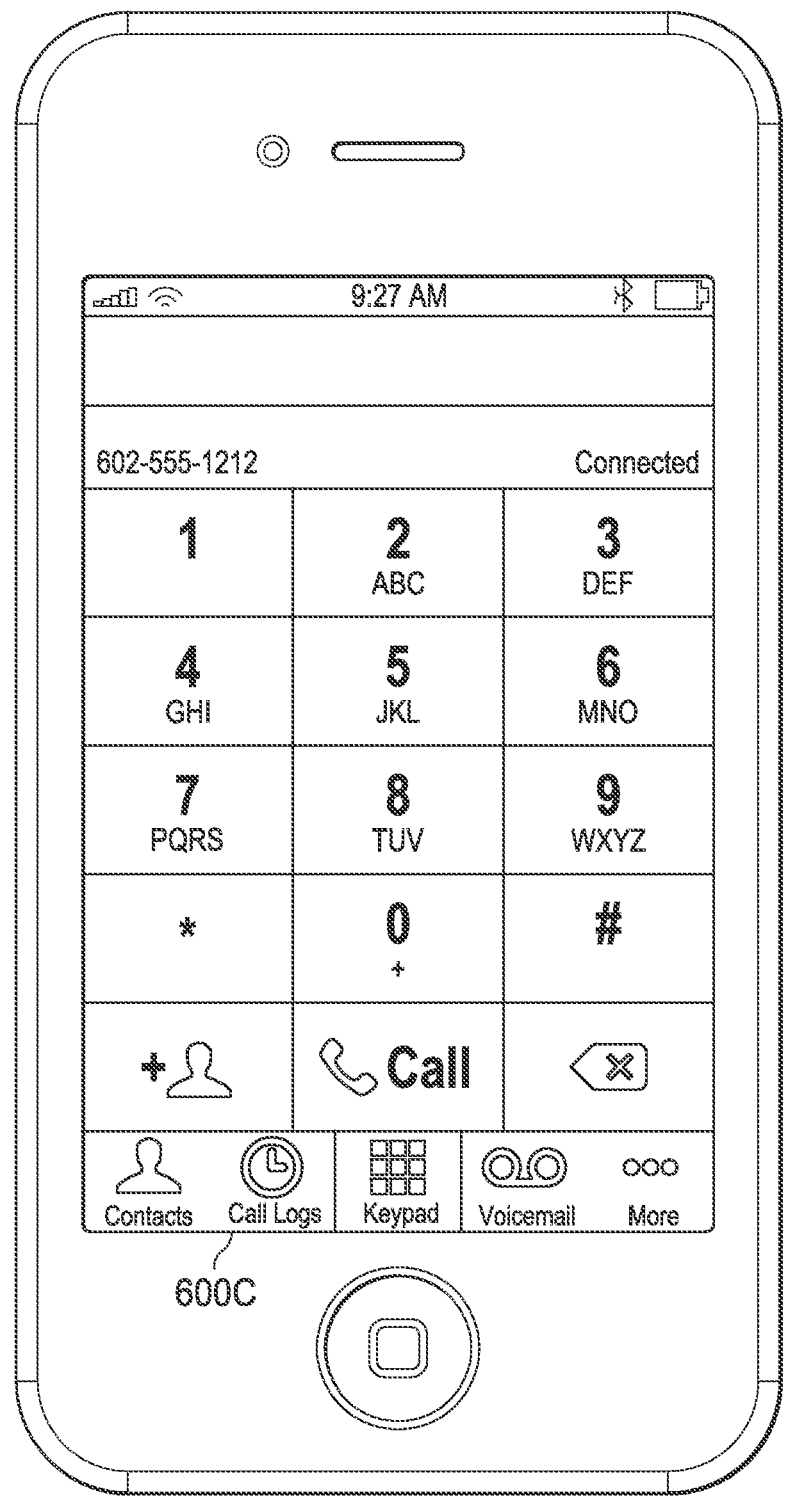
Figure 6D:
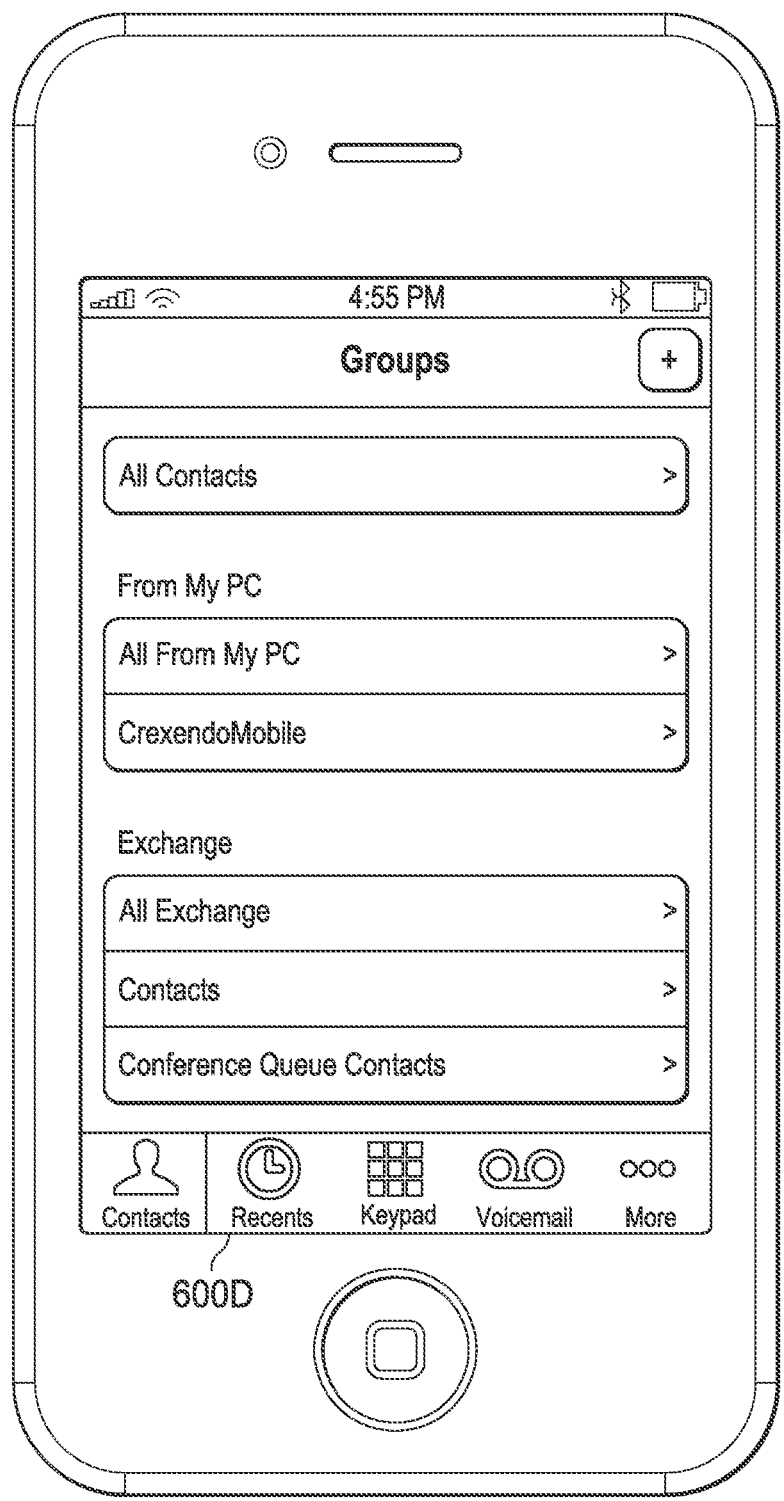

In FIG. 6C, screenshot 600C shows a keypad screen that enables a user to place a call in response to selection of a "keypad" icon. The screenshot 600C also shows other selectable icons or buttons including a "contacts" icon, a "call logs" icon, a "voicemail" icon, and a "more" icon. In FIG. 6D, screenshot 600D shows a contact list that is displayed upon selection of the "contacts" icon for the client-side telephony application. As shown, the contact list may be organized to display all contacts, contacts stored locally (on my PC), and contacts stored on an exchange server. The contact list may also include conference queue contacts corresponding to scheduled conferences or previous conferences.

Figure 6E:
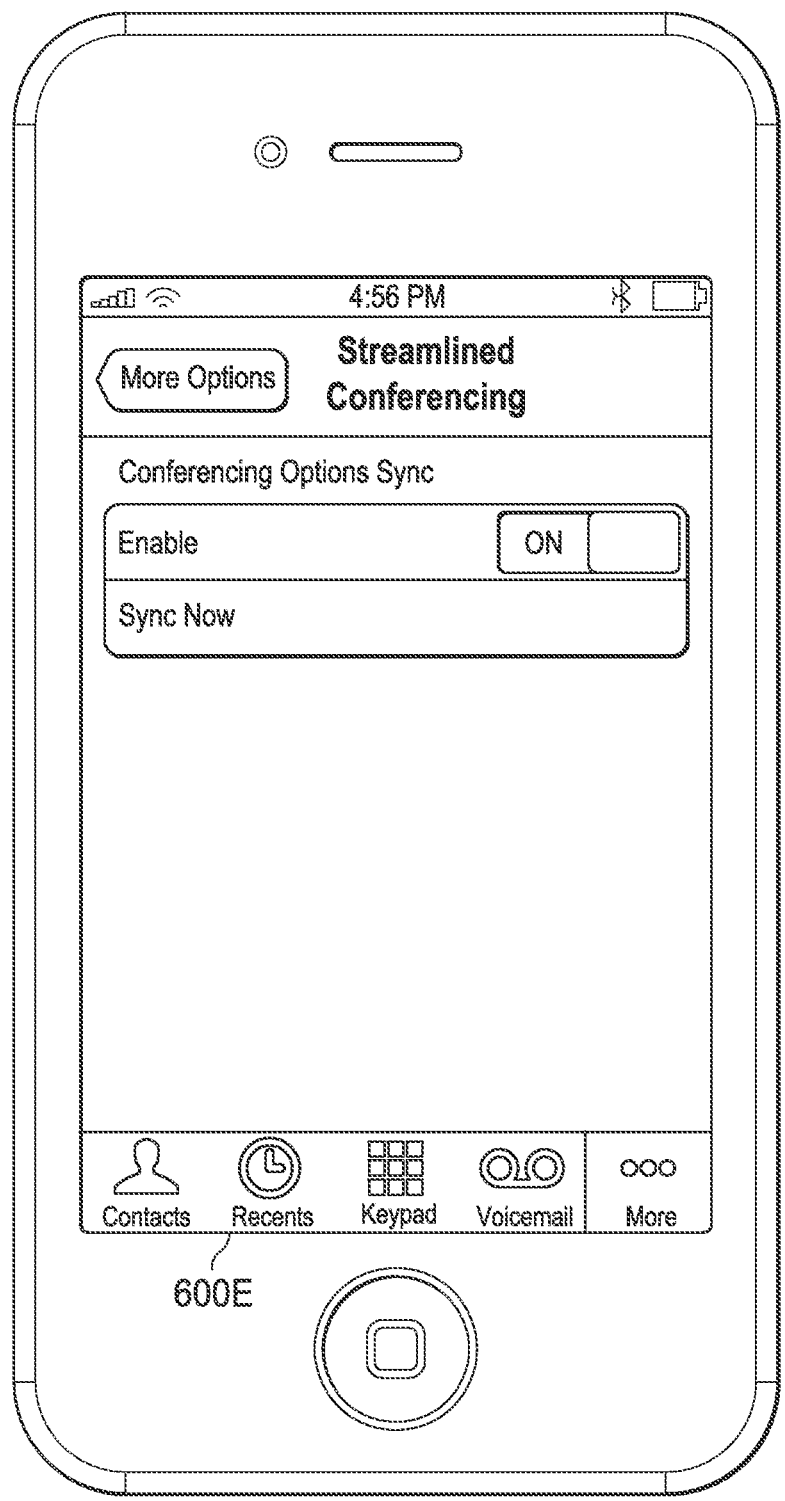
Figure 6F:
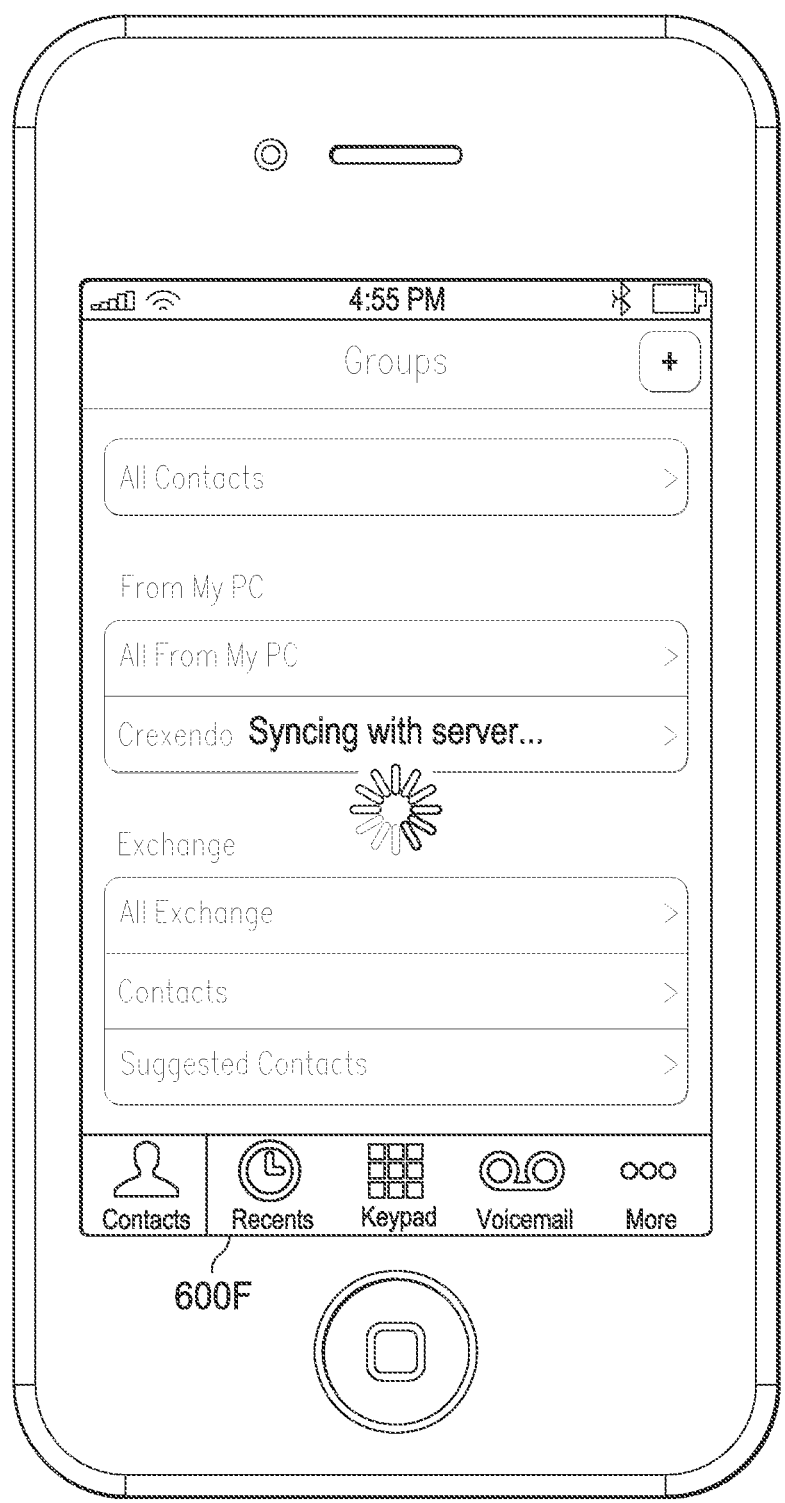
Figure 6G:
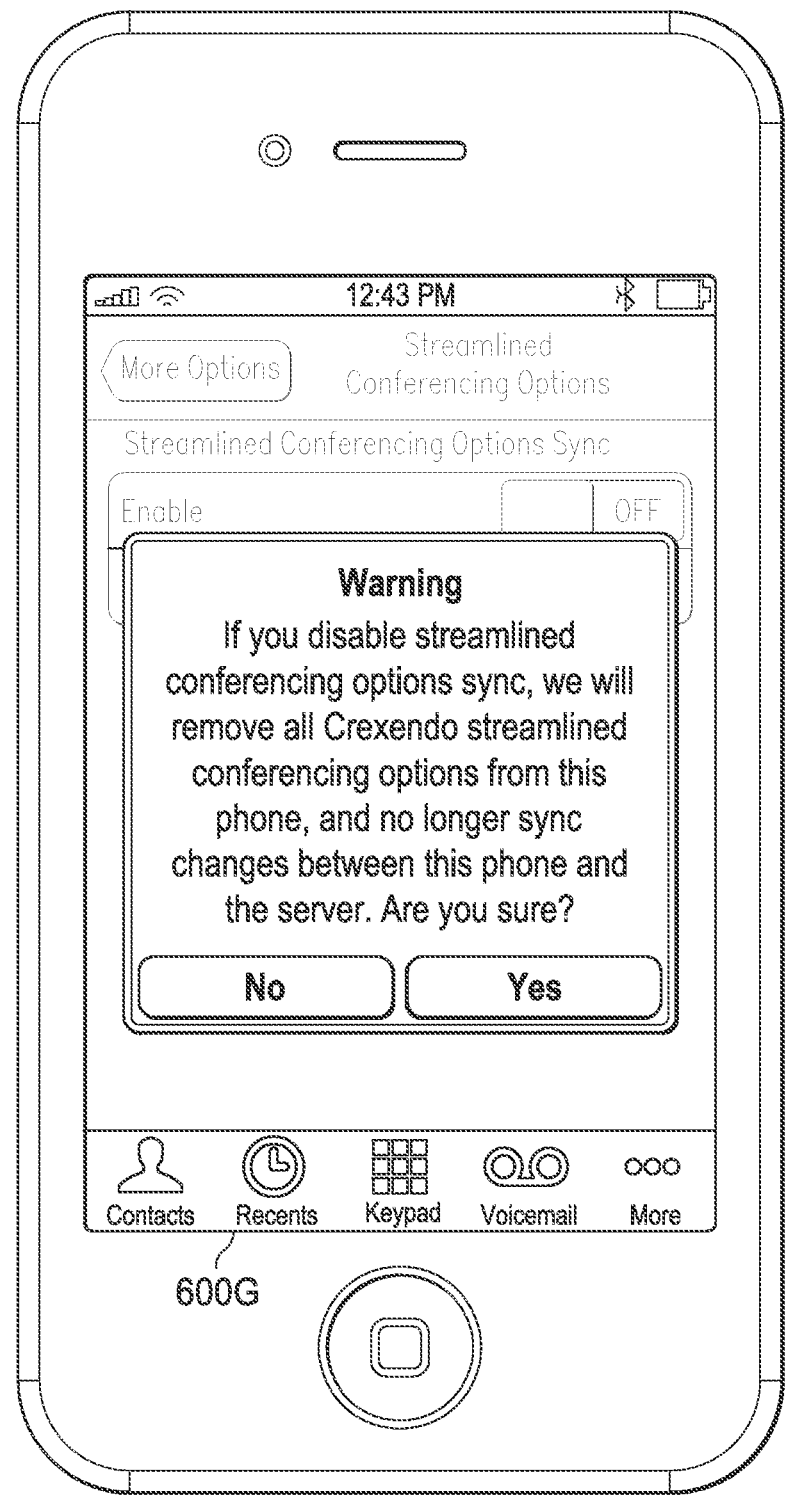

In FIG. 6E, screenshot 600E shows a streamlined conferencing options sync feature of the client-side telephony application that is available when the "more" icon is selection. When the streamlined conferencing options sync feature is turned on, the streamlined conferencing options available to the client-side telephony application can be updated via a scheduled or unscheduled sync with a telephony server. Screenshot 600F of FIG. 6F shows a streamlined conferencing options syncing operation. When the streamlined conferencing options sync feature shown in screenshot 600E is turned off, streamlined conferencing options related to the VOIP service are removed and updates are disabled until the streamlined conferencing options sync feature is turned on again. Screenshot 600G of FIG. 6G shows a warning message that may be displayed before finalizing a selection to disable the streamlined conferencing options sync feature.

Figure 6H:
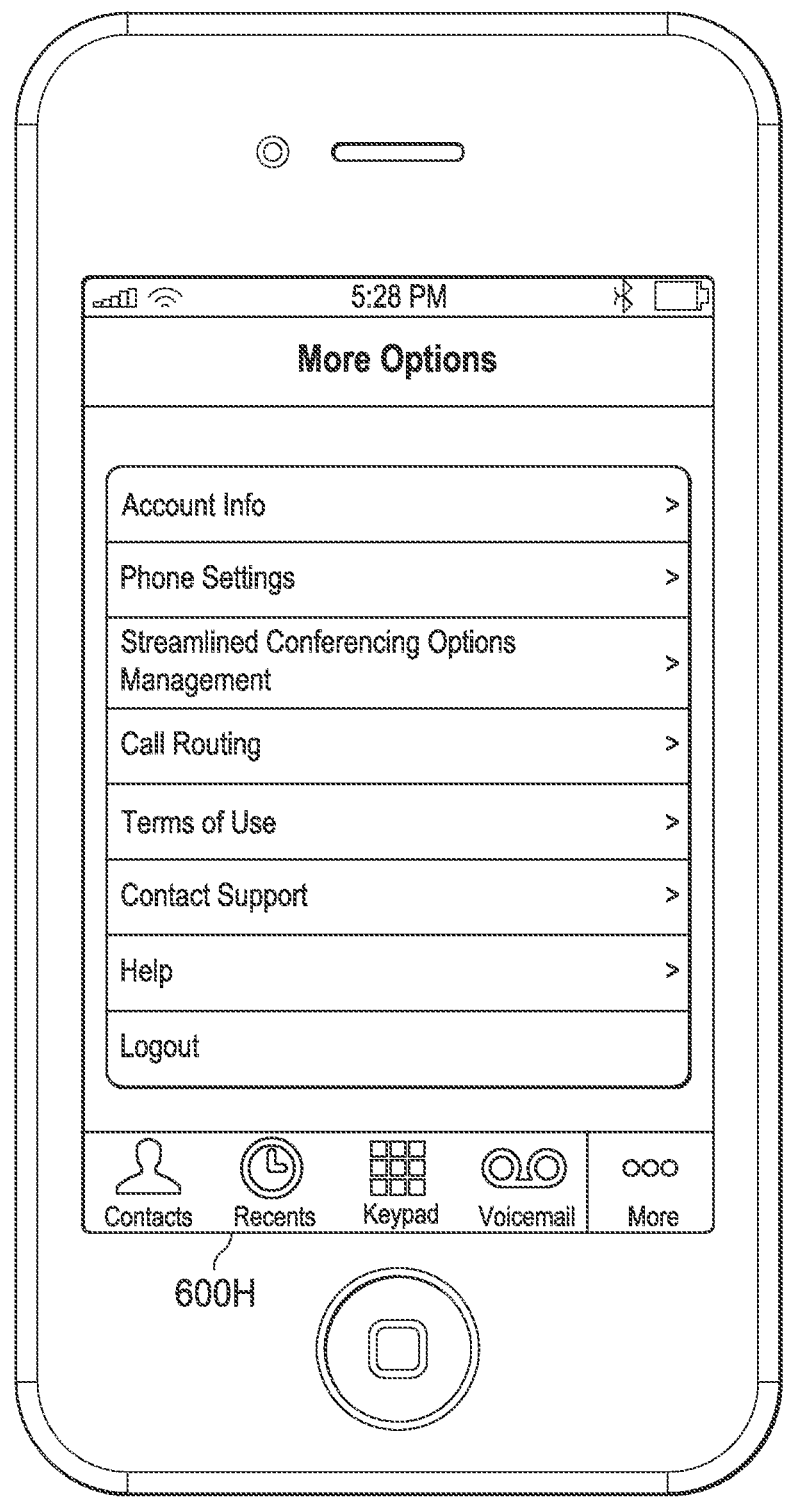

FIG. 6H shows a screenshot 600H that displays various options when the "more" icon of the client-side telephony application is selected. More specifically, selectable tabs for account information, phone settings, streamlined conferencing options management (e.g., to access screenshot 600E and/or other screens to select available conferencing options as described herein), call routing, terms of use, contact support, help, and logout are displayed in screenshot 600H.

Figure 7:
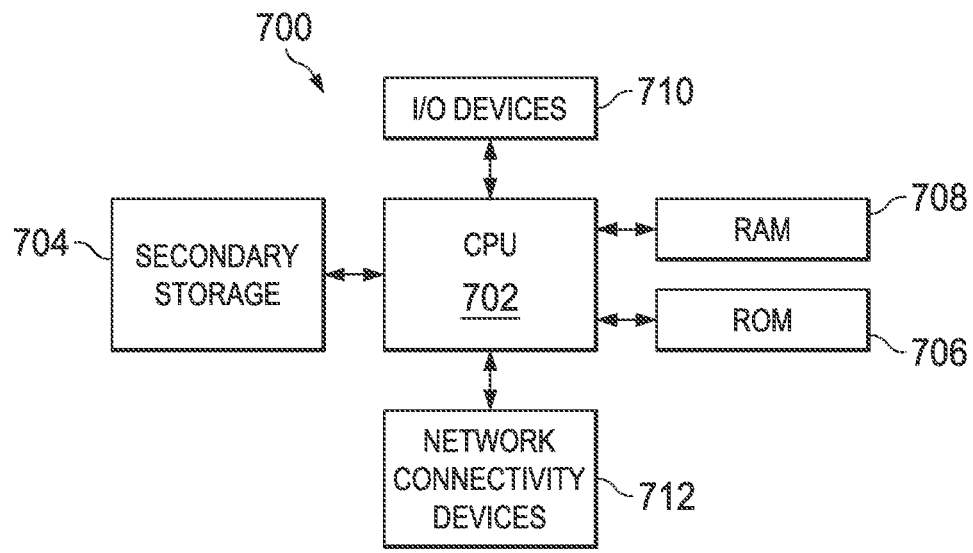
FIG. 7 shows components of a computer system in accordance with an embodiment of the disclosure.

FIG. 7 shows an example of various components of a computer system 700 in accordance with the disclosure. The computer system 700 may perform various operations to support the teleconferencing operations described herein. The computer system 700 may correspond to components of the mobile device 122, the cloud communication system cluster 102, the devices 204 or 244 the mobile device 304, the mobile device 400, or the telephony server 500 described herein.

As shown, the computer system 700 includes a processor 702 (which may be referred to as a central processor unit or CPU) that is in communication with memory devices including secondary storage 704, read only memory (ROM) 706, random access memory (RAM) 708, input/output (I/O) devices 710, and network connectivity devices 712. The processor 702 may be implemented as one or more CPU chips.

It is understood that by programming and/or loading executable instructions onto the computer system 700, at least one of the CPU 702, the RAM 708, and the ROM 706 are changed, transforming the computer system 700 in part into a particular machine or apparatus having the novel functionality taught by the present disclosure. In the electrical engineering and software engineering arts functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. For example, a design that is still subject to frequent change may be implemented in software, because re-spinning a hardware implementation is more expensive than re-spinning a software design. Meanwhile, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 704 may be comprised of one or more disk drives or tape drives and is used for non-volatile storage of data and as an over-flow data storage device if RAM 708 is not large enough to hold all working data. Secondary storage 704 may be used to store programs which are loaded into RAM 708 when such programs are selected for execution. The ROM 706 is used to store instructions and perhaps data which are read during program execution. ROM 706 is a non-volatile memory device which typically has a small memory capacity relative to the larger memory capacity of secondary storage 704. The RAM 708 is used to store volatile data and perhaps to store instructions. Access to both ROM 706 and RAM 708 is typically faster than to secondary storage 704. The secondary storage 704, the RAM 708, and/or the ROM 706 may be referred to in some contexts as computer readable storage media and/or non-transitory computer readable media.

I/O devices 710 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 712 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 712 may enable the processor 702 to communicate with the Internet or one or more intranets. With such a network connection, it is contemplated that the processor 702 might receive information from the network, or might output information to the network in the course of performing the above-described method steps. Such information, which is often represented as a sequence of instructions to be executed using processor 702, may be received from and outputted to the network, for example, in the form of a computer data signal embodied in a carrier wave.

Such information, which may include data or instructions to be executed using processor 702 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods known to one skilled in the art. The baseband signal and/or signal embodied in the carrier wave may be referred to in some contexts as a transitory signal.

The processor 702 executes instructions, codes, computer programs, scripts which it accesses from hard disk, floppy disk, optical disk (these various disk based systems may all be considered secondary storage 704), ROM 706, RAM 708, or the network connectivity devices 712. While only one processor 702 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 704, for example, hard drives, floppy disks, optical disks, and/or other device, the ROM 706, and/or the RAM 708 may be referred to in some contexts as non-transitory instructions and/or non-transitory information.

In an embodiment, the computer system 700 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 700 to provide the functionality of a number of servers that is not directly bound to the number of computers in the computer system 700. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the streamlined conferencing functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 700, at least portions of the contents of the computer program product to the secondary storage 704, to the ROM 706, to the RAM 708, and/or to other non-volatile memory and volatile memory of the computer system 700. The processor 702 may process the executable instructions and/or data structures in part by directly accessing the computer program product, for example by reading from a CD-ROM disk inserted into a disk drive peripheral of the computer system 700. Alternatively, the processor 702 may process the executable instructions and/or data structures by remotely accessing the computer program product, for example by downloading the executable instructions and/or data structures from a remote server through the network connectivity devices 712. The computer program product may comprise instructions that promote the loading and/or copying of data, data structures, files, and/or executable instructions to the secondary storage 704, to the ROM 706, to the RAM 708, and/or to other non-volatile memory and volatile memory of the computer system 700.

In some contexts, the secondary storage 704, the ROM 706, and the RAM 708 may be referred to as a non-transitory computer readable medium or a computer readable storage media. A dynamic RAM embodiment of the RAM 708, likewise, may be referred to as a non-transitory computer readable medium in that while the dynamic RAM receives electrical power and is operated in accordance with its design, for example during a period of time during which the computer 700 is turned on and operational, the dynamic RAM stores information that is written to it. Similarly, the processor 702 may comprise an internal RAM, an internal ROM, a cache memory, and/or other internal non-transitory storage blocks, sections, or components that may be referred to in some contexts as non-transitory computer readable media or computer readable storage media.

In some examples, a non-transitory computer-readable storage medium may store telephony instructions that, when executed, cause the processor 702 to perform the server-side streamlined conferencing operations described herein. In other examples, a non-transitory computer-readable storage medium may store telephony instructions that, when executed, cause the processor 702 to perform the client-side streamlined conferencing operations described herein.

Figure 8:
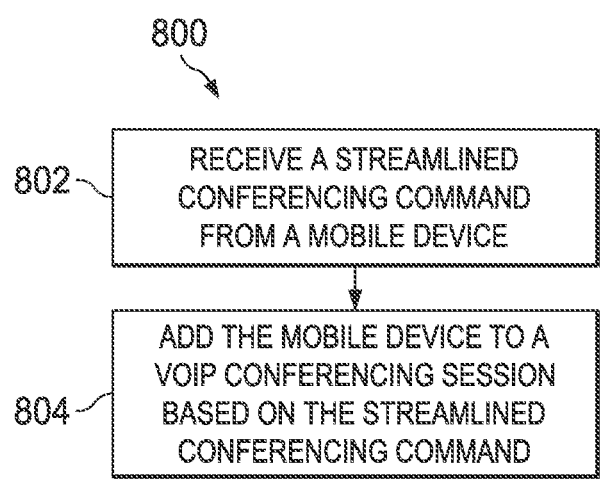
FIG. 8 shows a telephony method in accordance with an embodiment of the disclosure.

FIG. 8 shows a telephony method 800 in accordance with an embodiment of the disclosure. The telephony method 800 may be performed by a telephony server that is part of a cloud communication system cluster 102 as described herein. As shown, the telephony method 800 comprises receiving a streamlined conferencing command from a mobile device (block 802). At block 804, the mobile device is added to a VOIP conferencing session based on the streamlined conferencing command.

In at least some embodiments, the method 800 may comprise additional or alternative steps. For example, the method 800 may additionally comprise storing a plurality of conferencing request bundles and matching the streamlined conferencing command to one of the stored conferencing request bundles to add the mobile device to the VOIP conferencing session. Further, the method 800 may comprise organizing the plurality of conferencing request bundles as a table with a participants field, a date/time field, and a conferencing options selection field. Further, the method 800 may comprise updating the stored conferencing request bundle corresponding to the streamlined conferencing command before the VOIP conferencing session begins based on information received from the mobile device. Further, the method 800 may comprise receiving a selection of conferencing options with the streamlined conferencing command, and adjusting the VOIP conferencing session based on the selection of conferencing options received with the streamlined conferencing command. Further, the method 800 may comprise sending an invitation or reminder to the mobile device before a scheduled time for the VOIP conferencing session, wherein the invitation or reminder includes a link associated with the streamlined conferencing command. Further, the method 800 may comprise sending an invitation or reminder to the mobile device before a scheduled time for the VOIP conferencing session, wherein the invitation or reminder includes a printable image associated with the streamlined conferencing command. Further, the method 800 may comprise sending an invitation or reminder to the mobile device before a scheduled time for the VOIP conferencing session, wherein the invitation or reminder includes a link to select conferencing options for the VOIP conferencing session. Further, the method 800 may comprise synchronizing updated conferencing options for the VOIP conferencing session with the mobile device before the VOIP conferencing session begins.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system, comprising:
at least one server comprising a processor to manage voice over internet protocol (VOIP) services, wherein the managed VOIP services provided by the at least one server comprise a streamlined conferencing service that adds a mobile device to a VOIP conferencing session based on a streamlined conferencing command received from the mobile device; wherein the streamlined conferencing service provided by the at least one server comprises:
receiving, from the mobile device, a selection of conferencing options with the streamlined conferencing command;
adjusting the VOIP conferencing session based on the selection of conferencing options received with the streamlined conferencing command;

synchronizing updated conferencing options for the VOIP conferencing session with the mobile device before the VOIP conferencing session begins based on streamlined conferencing options synchronization being selectably enabled on the mobile device; and deactivating all synchronization of streamlined conferencing options with the mobile device and removing all streamlined conferencing options from the mobile device based on streamlined conferencing options synchronization being selectably disabled on the mobile device.

2. The system of claim 1, further comprising a database in communication with the at least one server, wherein the database stores a plurality of conferencing request bundles, and wherein streamlined conferencing service comprises matching the streamlined conferencing command to one of the stored conferencing request bundles to add the mobile device to the VOIP conferencing session.

3. The system of claim 2, wherein the plurality of conferencing request bundles are organized in the database as a table with a participants field, a date/time field, and a conferencing options selection field.

4. The system of claim 2, wherein the streamlined conferencing service provided by the at least one server comprises updating the stored conferencing request bundle corresponding to the streamlined conferencing command before the VOIP conferencing session begins based on information received from the mobile device.

5. The system of claim 1, wherein the streamlined conferencing service provided by the at least one server comprises sending an invitation or reminder to the mobile device before a scheduled time for the VOIP conferencing session, wherein the invitation or reminder includes a link associated with the streamlined conferencing command.

6. The system of claim 1, wherein the streamlined conferencing service provided by the at least one server comprises sending an invitation or reminder to the mobile device before a scheduled time for the VOIP conferencing session, wherein the invitation or reminder includes a printable image associated with the streamlined conferencing command.

7. The system of claim 1, wherein the streamlined conferencing service provided by the at least one server comprises sending an invitation or reminder to the mobile device before a scheduled time for the VOIP conferencing session, wherein the invitation or reminder includes a link to select conferencing options for the VOIP conferencing session.

8. A method, comprising:
receiving, by a processor, a streamlined conferencing command from a mobile device; and
adding, by the processor, the mobile device to a VOIP conferencing session based on the streamlined conferencing command;
receiving, by the processor, from the mobile device, a selection of conferencing options with the streamlined conferencing command, and adjusting the VOIP conferencing session based on the selection of conferencing options received with the streamlined conferencing command;
synchronizing updated conferencing options for the VOIP conferencing session with the mobile device before the VOIP conferencing session begins based on streamlined conferencing options synchronization being selectably enabled on the mobile device; and
deactivating all synchronization of streamlined conferencing options with the mobile device and removing all streamlined conferencing options from the mobile device based on streamlined conferencing options synchronization being selectably disabled on the mobile device.

9. The method of claim 8, further comprising storing a plurality of conferencing request bundles and matching the streamlined conferencing command to one of the stored conferencing request bundles to add the mobile device to the VOIP conferencing session.

10. The method of claim 9, further comprising organizing the plurality of conferencing request bundles as a table with a participants field, a date/time field, and a conferencing options selection field.

11. The method of claim 9, further comprising updating the stored conferencing request bundle corresponding to the streamlined conferencing command before the VOIP conferencing session begins based on information received from the mobile device.

12. The method of claim 8, further comprising sending an invitation or reminder to the mobile device before a scheduled time for the VOIP conferencing session, wherein the invitation or reminder includes a link associated with the streamlined conferencing command.

13. The method of claim 8, further comprising sending an invitation or reminder to the mobile device before a scheduled time for the VOIP conferencing session, wherein the invitation or reminder includes a printable image associated with the streamlined conferencing command.

14. The method of claim 8, further comprising sending an invitation or reminder to the mobile device before a scheduled time for the VOIP conferencing session, wherein the invitation or reminder includes a link to select conferencing options for the VOIP conferencing session.

15. A mobile communication device, comprising:
a processor;
a non-transitory computer-readable medium storing a telephony application, wherein the telephony application, when executed, causes the processor to:
transmit a streamlined conferencing command to add the mobile device to a voice over internet protocol (VOIP) conferencing session;
transmit a selection of conferencing options with the streamlined conferencing command, wherein the selection of conferencing options causes a server receiving the selection of conferencing options with the streamlined conferencing command to adjust the VOIP conferencing session based on the selection of conferencing options;
synchronize updated conferencing options for the VOIP conferencing session with server before the VOIP conferencing session begins based on streamlined conferencing options synchronization being selectably enabled on the mobile device and the updated conferencing options being received from the server; and
deactivate all synchronization of streamlined conferencing options with the server and remove all streamlined conferencing options from the mobile device based on streamlined conferencing options synchronization being selectably disabled on the mobile device.

16. The mobile communication device of claim 15, wherein the telephony application, when executed, causes the processor to trigger transmission of the streamlined conferencing command in response to user selection of a conferencing link from within an email or short message service (SMS) message.

17. The mobile communication device of claim 15, wherein the telephony application, when executed, causes the processor to trigger transmission of the streamlined conferencing command in response to user selection of a conferencing link within a calendar.

18. The mobile communication device of claim 15, wherein the telephony application, when executed, causes the processor to trigger transmission of the streamlined conferencing command in response to user selection of a conferencing link within a push notification reminder.

19. The mobile communication device of claim 15, wherein the telephony application, when executed, causes the processor to trigger transmission of the streamlined conferencing command in response to user selection of a conferencing link within a previously received conference invitation.

20. The mobile communication device of claim 15, wherein the telephony application, when executed, causes the processor to trigger transmission of the streamlined conferencing command in response to the mobile communication device scanning a conference link image with the mobile communication device.

21. The mobile communication device of claim 20, wherein the conference link image comprises a quick response (QR) code, a bar code, or an alphanumeric code.

22. The mobile communication device of claim 15, wherein the telephony application, when executed, causes the processor to activate for the VOIP conferencing session a predetermined subset of conferencing features from among a plurality of conferencing features supported by the mobile communication device.

23. The mobile communication device of claim 22, wherein the plurality of conferencing features comprise a number of participants, a video option, a whiteboard option, a workspace option, and a document display option.

24. The mobile communication device of claim 15, wherein the telephony application, when executed, causes the processor to trigger transmission of the streamlined conferencing command in response to a voice input.

25. The mobile communication device of claim 15, further comprising a dedicated conferencing queue button, wherein the telephony application, when executed, causes the processor to trigger transmission of the streamlined conferencing command in response to the dedicated conferencing queue button being pressed.

* * * * *